US012673706B2

(12) United States Patent
Xiao et al.

(10) Patent No.: US 12,673,706 B2
(45) Date of Patent: Jul. 7, 2026

(54) MEASUREMENT METHOD OF METRO RAIL CORRUGATION BASED ON THE SEQ2SEQ MODEL AND THE FUSION DATA OF VIBRATION AND NOISE

(71) Applicant: BEIJING JIAOTONG UNIVERSITY, Beijing (CN)

(72) Inventors: Hong Xiao, Beijing (CN); Yang Wang, Beijing (CN); Liang Gao, Beijing (CN); Shuwei Fang, Beijing (CN); Xiubo Liu, Beijing (CN); Zhihai Zhang, Beijing (CN); Guangming Shi, Beijing (CN); Feng Jin, Beijing (CN); Gang Wang, Beijing (CN); Yan Xiao, Chongqing (CN); Libin Ye, Beijing (CN); Yihao Chi, Beijing (CN); Guangpeng Liu, Guangzhou (CN); Shaolei Wei, Beijing (CN); Guangsheng Chen, Beijing (CN); Zhongxia Qian, Beijing (CN); Jianjun Ma, Beijing (CN); Chang Xiao, Beijing (CN); Yuze Cao, Tianjin (CN); Yawen Zhang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 431 days.

(21) Appl. No.: 18/455,237

(22) Filed: Aug. 24, 2023

(65) Prior Publication Data

US 2024/0343277 A1 Oct. 17, 2024

(30) Foreign Application Priority Data

Apr. 13, 2023 (CN) .......................... 202310393235.0

(51) Int. Cl.
B61K 9/08 (2006.01)
G01N 19/08 (2006.01)

(52) U.S. Cl.
CPC .............. B61K 9/08 (2013.01); G01N 19/08 (2013.01)

(58) Field of Classification Search
CPC .......... B61K 9/08; G01N 19/08; Y02T 90/00; G06F 18/22; G06F 18/10; G06F 18/214;
(Continued)

(56) References Cited

U.S. PATENT DOCUMENTS

2020/0104639 A1* 4/2020 Didari .................... G06N 3/045
2021/0089579 A1* 3/2021 Shu .......................... H04L 51/02
(Continued)

FOREIGN PATENT DOCUMENTS

CN 114169422 A * 3/2022 .......... G06F 18/2411

*Primary Examiner* — Shelby A Turner
*Assistant Examiner* — Cynthia L Davis
(74) *Attorney, Agent, or Firm* — CBM PATENT CONSULTING, LLC

(57) ABSTRACT

A metro rail corrugation measurement method based the Seq2Seq model and vibration and noise data fusion comprises the following steps: Constructing a time series data set corresponding to floor longitudinal acceleration and train speed based on historical data of metro trains; Constructing the metro train mileage matching prediction model based on the Seq2Seq model, training the metro train mileage matching prediction model by time series data sets, and inputting the inside floor longitudinal acceleration of the metro train to be detected into the trained metro train mileage matching prediction model to obtain the running speed of the metro train to be detected. According to the vibration and noise data of the metro train to be detected, the vibration and noise composite index of the rail corrugation is calculated to (Continued)

determine the wavelength and amplitude information corresponding to the rail corrugation.

7 Claims, 10 Drawing Sheets

(58) Field of Classification Search
CPC .. G06F 18/25; G06F 2218/04; G06F 2218/12; G06N 3/0442; G06N 3/08
See application file for complete search history.

(56) References Cited

U.S. PATENT DOCUMENTS

2023/0186161 A1*   6/2023   Arthur  .................. G06F 40/211
                                                        704/2
2024/0317282 A1*   9/2024   Horn  ..................... B61L 25/025

* cited by examiner

MEASUREMENT METHOD OF METRO RAIL CORRUGATION BASED ON THE SEQ2SEQ MODEL AND THE FUSION DATA OF VIBRATION AND NOISE

CROSS-REFERENCE TO RELATED APPLICATIONS

This application claims priority to Chinese Patent Application Ser. No. CN2023103932350 filed on 13 Apr. 2023.

TECHNICAL FIELD

The invention relates to the technical field of rail corrugation measurement, in particular to a metro rail corrugation measurement method based on the Seq2Seq model and the fusion data of vibration and noise.

TECHNICAL BACKGROUND

Rail corrugation refers to a kind of periodic wavy uneven wear along the longitudinal surface of rail. In recent years, with the rapid development of urban rail transit, rail corrugation of metro lines has become more serious due to various track types, small curve radius, frequent starting and braking, high running density and other reasons, which has led to a series of problems, such as fastener elastic strip fracture, vehicle suspension fatigue, the inside vibration and noise, the secondary noise of residential buildings along the line and so on. At present, rail grinding is still the most economical and effective measure to control rail corrugation. However, when arranging the rail grinding plan on site, it is often faced with the choice of operation parameters such as grinding mileage, grinding depth and grinding times. In the past, most of the maintenance personnel used static measurement methods such as wave grinding trolley and steel ruler under offline time to obtain the rail grinding state, and combined with vibration and noise complaint section to manually select the operation parameters such as grinding mileage. This not only takes up maintenance personnel, the detection efficiency is low, but also often arranges grinding after passengers complain, which greatly affects passengers' riding experience and is not conducive to the green development of rail transit. In addition, due to the limited number of rail grinding vehicles, how to arrange the grinding in conformity with the rail corrugation state, and to make rational use of rail grinding vehicles, to realize the transformation from "planned repair" to "state repair", which is also an important problem faced by the on-site operation department.

At present, there are many intelligent identification methods of rail corrugation in current technology. However, due to the GPS positioning signal is weak when the subway runs in the tunnel, and the data of train speed measuring wheelsets cannot be easily obtained, the intelligent identification algorithm of rail corrugation in the above-mentioned current technology could only roughly identify whether there is corrugation in a certain section, which are mostly identified by axle box acceleration or acoustic signals, with problems such as difficulty in obtaining original data and low testing efficiency in field application. As a result, there is an urgent need for a high-precision, high-efficiency measurement method for rail corrugation in metro, which is able to simultaneously identify key information such as the characteristic wavelength, amplitude and the location of rail corrugation.

Invention Content

The example of the invention provides a metro rail corrugation measurement method based on the Seq2Seq model and vibration and noise data fusion, so as to realize accurate identification of rail corrugation characteristic wavelength and amplitude.

In order to achieve the above objectives, the invention adopts the following technical scheme.

Based on the historical data of metro trains, a time series data set corresponding to floor longitudinal acceleration and train speed is constructed;

A metro train mileage matching prediction model is constructed based on Seq2Seq model, which is trained by the time series data set corresponding to the longitudinal acceleration;

Inputting the longitudinal acceleration of the floor inside train to be detected into a trained metro train mileage matching prediction model based on the Seq2Seq model to obtain the running speed of the metro train to be detected;

According to the preset wavelength distribution range of the metro rail corrugation, the running speed of the metro train to be detected, the vertical vibration acceleration of the floor and the sound pressure signal in the train, the vibration and noise composite index of the train rail corrugation to be detected is calculated, by which the specific position generated by the corrugation could be determined, so do as the corresponding characteristic wavelength and amplitude.

Preferably, the time series data set corresponding to the floor longitudinal acceleration and the train speed is constructed based on the historical data of the metro train, including:

The vertical and longitudinal vibration acceleration signals of the floor surface at the bogie position in the metro train is acquired based on the historical data of the metro train, via which could obtain the vertical and longitudinal vibration time domain information of the floor in the metro train;

After acquiring the sound pressure measured signal at the bogie position in the metro train, the sound pressure time domain information in the train could be obtained accordingly;

After acquiring the measured speed signal on a speed measuring wheelset of the metro train, the train speed signal could be obtained accordingly;

On the basis of the preset window length, the longitudinal vibration acceleration signal and the train speed signal of the floor surface are divided into the longitudinal acceleration and train speed signal of the segmented floor, generating a time series data set corresponding to the longitudinal vibration acceleration signal and the train speed.

Preferably, according to a preset window length, the longitudinal vibration acceleration signal and the train speed signal of the floor surface is divided into segmented floor longitudinal acceleration signals and train speed signals to generate a time series data set corresponding to the longitudinal vibration acceleration signal and the train speed, including:

The longitudinal vibration acceleration signal and the train speed signal are resampled to ensure that the length of the longitudinal acceleration time series is equal to that of the train speed time series, setting as $L_s$;

When the time series of longitudinal acceleration is $x_i$ ($i=0, 1, \ldots, x_n$), the time series of train speed is $y_j$ ($j=0, 1, \ldots, y_n$), and the step number of time is set to K, the sample number of the constructed data set is determined by formula (1);

$$N = L_s - K + 1 \qquad (1)$$

The time series data set corresponding to the longitudinal vibration acceleration signal and the train speed is determined by formula (2);

$$\{[[x_0, x_1, \dots, x_{K-1}], [y_0, y_1, \dots, y_{K-1}]], \qquad (2)$$

$$[[x_K, x_{K+1}, \dots, x_{2K-1}], [y_K, y_{K+1}, \dots, y_{2K-1}]],$$

$$\dots$$

$$[[x_{NK}, x_{NK+1}, \dots, x_{NK-1}], [y_{NK}, y_{NK+1}, \dots, y_{NK-1}]]\}$$

Preferably, the metro train mileage matching prediction model constructed based on the Seq2Seq model, takes the use of the time series data set corresponding to the longitudinal acceleration and the train speed to train, obtaining a trained metro train mileage matching prediction model, includes:

When constructing a metro train mileage matching prediction model based on Seq2Seq model, the metro train mileage matching prediction model belongs to the Many to Many model of the recurrent neural network, wherein the encoder partially takes the use of the recurrent neural network model to encode the longitudinal acceleration time series and outputs the hidden state of the last step, and the decoder is also composed of the recurrent neural network and applies the hidden state of the last step of the encoder, with the train speed time series input;

Dividing the time series data set corresponding to the longitudinal acceleration and the train speed into the training set, the verification set and the test set, the training set is input into the metro train mileage matching prediction model, searching for the optimal parameters of the model through K-fold cross verification;

Inputting the verification set into the metro train mileage matching prediction model utilizing its optimal parameters to verify the metro train mileage matching prediction model, the trained metro train mileage matching prediction model based on the Seq2Seq model is obtained after passing the verification, wherein the input data of the trained metro train mileage matching prediction model based on the Seq2Seq model is the longitudinal acceleration time series of the metro train interior floor, and the output data is the time series corresponding to the running speed of the metro train.

Preferably, the rail corrugation vibration and noise composite index of the metro train to be detected is calculated according to the preset wavelength distribution range of the metro rail corrugation, and the running speed, the floor vertical vibration acceleration as well as the inside sound pressure signal of the metro train to be detected, including:

Acquiring the running speed, the floor vertical vibration acceleration signal and the sound pressure signal in the car of the metro train to be detected, the band-pass filtering is carried out sectionally on the floor vertical vibration acceleration and the sound pressure signal inside of the train to be detected in line with the wavelength distribution range of the preset metro rail corrugation and the running speed of the metro train to be detected;

Calculating the vibration index and noise index corresponding to the floor vertical vibration acceleration signal and the sound pressure signal in the vehicle after the band-pass filtering, and retaining the floor vertical vibration acceleration signal and the sound pressure signal in the vehicle whose vibration index and noise index are greater than the preset threshold, the further calculation can be worked out on the rail corrugation vibration and noise composite index of the reserved floor vertical vibration acceleration signal and the sound pressure signal in the vehicle.

Preferably, according to the preset rail corrugation wavelength distribution range and the running speed of the metro train to be detected, the segmented band-pass filtering is carried out on the floor vertical vibration acceleration and the inside sound pressure signal of the metro train to be detected, including:

Assuming that the floor vertical vibration acceleration signal of the metro train to be detected, equal to the sound pressure signal in the car, is set as $L_v$, segment length as W and overlap ratio as ¾. If the remaining signal length is greater than or equal to W, add 0 until the length is equal to W; Otherwise, abandon the remaining signal;

On the basis of the preset wave length distribution range $[\lambda_L, \lambda_H]$ of metro rail corrugation, the corresponding upper and lower cutoff frequencies $[f_L, f_H]$ are calculated. And the band-pass filter based on the window function method is designed, with the filter order n, to band-pass filter the segmented floor vertical vibration acceleration signal and the inside sound pressure signal of the metro train to be detected, obtaining the band-pass filtered segmented floor vertical vibration acceleration signal $sig_{vb}$ and the inside sound pressure signal $sig_{no}$;

Wherein the upper and lower cutoff frequencies are determined by formula (3);

$$f_L = \frac{\overline{V}_W}{\lambda_H}, f_H = \frac{\overline{V}_W}{\lambda_L} \qquad (3)$$

In the formula, $\overline{V}_W$ is the average speed of segmented trains determined in line with the matching prediction model of metro train mileage.

Preferably, the following parts are included in the calculation of the vibration and noise composite index corresponding to the filtered floor vertical vibration acceleration signal and the sound pressure signal in the vehicle:

Calculating the self-power spectral density of the segmented floor vertical vibration acceleration signal $sig_{vb}$, and finding the peak frequency $f_{vmax}$ in the $[f_L, f_H]$ frequency band, band-pass filter remains carrying out on the segmented vertical vibration acceleration signal $sig_{vb}$ according to $[f_{vmax}-D, f_{vmax}+D]$, and the vibration index is determined by formula (4);

$$VI(i) = \frac{S_{Vi}\left(filter_{(f_v \, max-D, f_v \, max+D)}[sig_{vb}]\right)}{S_{Vtotal}} \qquad (4)$$

Where VI(i) is the vibration index of the $i^{th}$ frame of the floor vertical vibration acceleration signal, $sig_{vb}$ is the vibration signal after the first filtering, filter is the band-pass filter, D is half of the pass-band width, $f_{vmax}$ is the peak frequency of the $i^{th}$ frame vibration signal in the self-power spectral density, $S_{Vtotal}$ is the effective value of the vibration signal after the first filtering, and $S_{Vi}$ is the effective value of the vibration signal after the second filtering, which is determined by formula (5);

$$S_{Vi} = \sqrt{\frac{\sum_{n=i}^{i+W} x_{Vn}^2}{W_V}} \tag{5}$$

In the formula, $W_V$ is the length of each frame vibration signal;

Calculating the self-power spectral density of the segmented inside sound pressure signal $sig_{no}$, and finding the peak frequency $f_{nmax}$ in the $[f_L, f_H]$ frequency band, band-pass filter continues to band-pass filter the segmented inside sound pressure signal $sig_{no}$ according to $[f_{nmax}-D, f_{nmax}+D]$, and the noise index is determined by formula (6);

$$NI(i) = \frac{S_{Ni}\big(filter_{(f_{n\ max}-D, f_{n\ max}+D)}[sig_{no}]\big)}{S_{Ntotal}} \tag{6}$$

In the formula, NI(i) is the noise index of the $i^{th}$ frame of the noise signal, $sig_{no}$ is the noise signal after the first filtering, filter is the window function band-pass filter, D is half of the pass-band width, $f_{nmax}$ is the peak frequency of the $i^{th}$ frame noise signal in the self-power spectral density, $S_{Ntotal}$ is the effective value of the noise signal after the first filtering, and $S_{Ni}$ is the effective value of the noise signal after the second filtering, which is determined by formula (7);

$$S_{Ni} = \sqrt{\frac{\sum_{n=1}^{i+W} x_{Nn}^2}{W_N}} \tag{7}$$

In the formula, $W_N$ is the length of each frame noise signal.

Preferably, as for the reserved floor vertical vibration acceleration signal and the sound pressure signal in the vehicle with vibration index and noise index greater than the preset threshold value, the further calculation could be implemented on the rail corrugation vibration and noise composite index of the reserved floor vertical vibration acceleration signal and the sound pressure signal in the vehicle, including:

It's determined that the vibration index threshold is $VI_m$ and the noise index threshold is $NI_m$. If the vibration index VI(i) corresponding to the vertical vibration acceleration signal of the segmented floor is greater than $VI_m$ and the noise index NI(i) corresponding to the segmented sound pressure signal in the vehicle is greater than $NI_m$, calculate the cross-power spectrum between the vertical vibration acceleration signal of the segmented floor and the sound pressure signal;

Finding the peak frequency $f_{vnmax}$ in the frequency band of $[f_L, f_H]$, and band-pass filtering the acoustic-vibration composite signal according to $[f_{vnmax}-D, f_{vnmax}+D]$, the vibration and noise composite index of the rail corrugation is determined by formula (8);

$$CVNI(i) = \frac{S_{VNi}\big(filter_{(f_{vn\ max}-D, f_{vn\ max}+D)}[sig_{vn}]\big)}{S_{VNtotal}} \tag{8}$$

In the formula, CVNI(i) is the vibration and noise composite index of the $i^{th}$ frame, $sig_{vn}$ is the acoustic-vibration composite signal, filter is the window function band-pass filter, D is half of the pass-band width, $f_{vnmax}$ is the peak frequency in the cross-power spectrum of the $i^{th}$ frame acoustic-vibration signal, $S_{VNtotal}$ is the effective value of the acoustic-vibration composite signal after the first filtering, and $S_{VNi}$ is the effective value of the acoustic-vibration composite signal after the second filtering, which is determined by formula (9);

$$S_{VNi} = \sqrt{\frac{\sum_{n=i}^{i+W} x_{VNn}^2}{W_{VN}}} \tag{9}$$

Preferably, the specific location of rail corrugation and the corresponding characteristic wavelength and wave depth amplitude is determined by the rail corrugation vibration and noise composite index, including:

If the speed v(t) is obtained by the metro train mileage matching prediction model based on the Seq2Seq model, the train position is determined by formula (10);

$$x(t) = \int_0^t v(t)dt \tag{10}$$

According to the peak frequency $f_{vnmax}$ and the average vehicle speed V corresponding to the segmented acoustic-vibration composite signal, the wavelength of rail corrugation is identified, which is determined by formula (11);

$$\lambda_{i,detect} = \begin{cases} 0, & \text{no corrugation in frame } i \\ \dfrac{V}{f_{vn\ max}}, & \text{corrugation in frame } i \end{cases} \tag{11}$$

The severity of rail corrugation, that is, the range of amplitude, is identified in accordance with the corrugation vibration and noise composite index corresponding to the segmented acoustic-vibration composite signal, which is determined by formula (12):

$$\begin{cases} CVNI(i) < 0.4 \rightarrow \text{general corrugation} \\ 0.3 < CVNI(i) < 0.6 \rightarrow \text{severe corrugation} \\ CVNI(i) > 0.6 \rightarrow \text{very severe corrugation} \end{cases} \tag{12}$$

It can be seen from the technical scheme provided by the above-mentioned invention that the metro train mileage matching prediction model based on the Seq2Seq model is trained by the longitudinal acceleration of the inside floor and the time series data of the train speed, the speed and mileage of the metro train are accurately predicted by the longitudinal acceleration of the car body. At the same time, the characteristic wavelength and the amplitude of the rail corrugation is accurately identified by the fusion of the vertical vibration acceleration of the floor and the sound pressure signal in the car.

The additional aspects and advantages of the invention will be elaborated partially below, which will be obvious from the following description, or may be learned by the practice of the invention.

BRIEF DESCRIPTION OF DRAWINGS

In order to explain the technical scheme of the invention embodiment more clearly, the drawings needed in the description of the embodiment will be briefly introduced below. Obviously, the drawings in the following description are only some embodiments of the invention. For the ordinary technical personnel in the field, they can obtain other drawings based on these drawings without creative work.

DETAILED DESCRIPTION

Hereinafter, the embodiments of the invention will be described in detail, whose examples are illustrated in the accompanying drawings, wherein the same or similar labels indicate the same or similar elements or elements with the same or similar functions throughout. The embodiments described below by referring to the attached drawings are exemplary, only for explaining the invention, and cannot be interpreted as limiting the invention.

It can be understood by those skilled in the field that the singular forms "a", "an", "the" and "this" used herein can also include plural forms unless specifically stated. It should be further understood that the word "including" used in the specification of the invention refers to the existence of the features, integers, steps, operations, elements and/or components, but does not exclude the existence or addition of one or more other features, integers, steps, operations, elements, components and/or groups thereof. Understandably, when we say that an element is "connected" or "coupled" to another element, it can be directly connected or coupled to the other element, or takes the use of the intervening elements. Furthermore, "connected" or "coupled" as used herein may include wireless connection or coupling. As used herein, the phrase "and/or" includes any unit and all combinations of one or more associated listed items.

It can be understood by those skilled in the field that unless additional defined, all terms (including technical terms and scientific terms) used herein have the same meaning as commonly understood by those skilled in the field to which this invention belongs. It should also be understood that terms such as those defined in general dictionaries should be comprehended to have meanings consistent with those in the context of the prior field, and would not be interpreted in an idealized or overly formal sense unless defined as such.

In order to facilitate the understanding of the invention embodiments, several specific examples will be further explained with reference to the attached drawings, and each example does not constitute a limitation of the of invention embodiments.

Example 1

Figure 1:
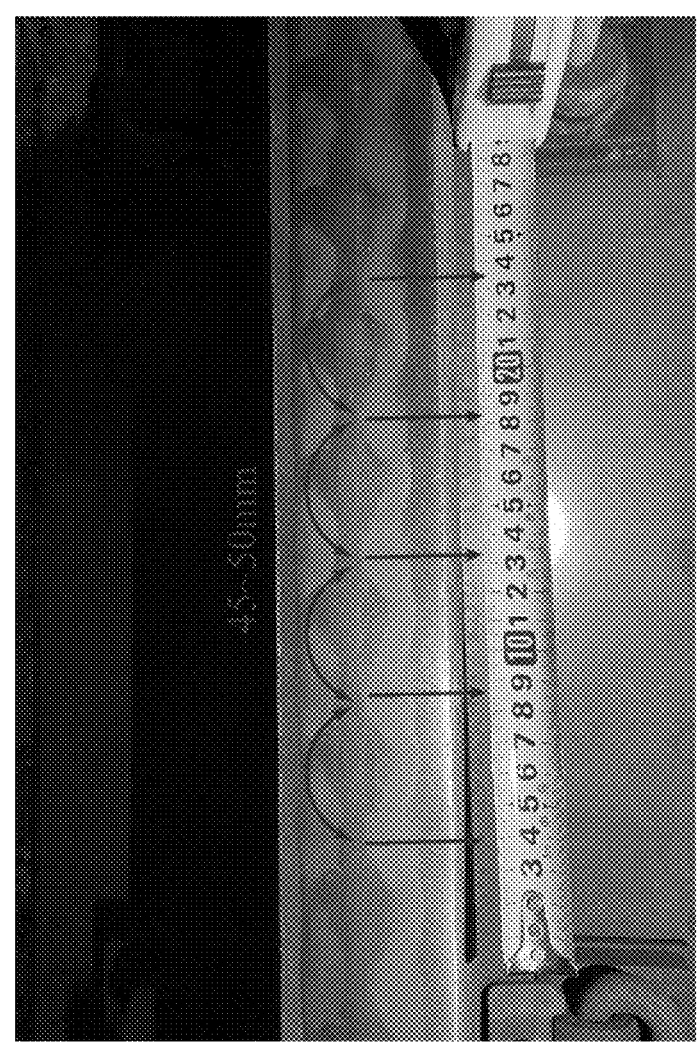
FIG. 1 is a schematic diagram for explaining the metro rail corrugation provided by the embodiment of the invention.
Figure 2:
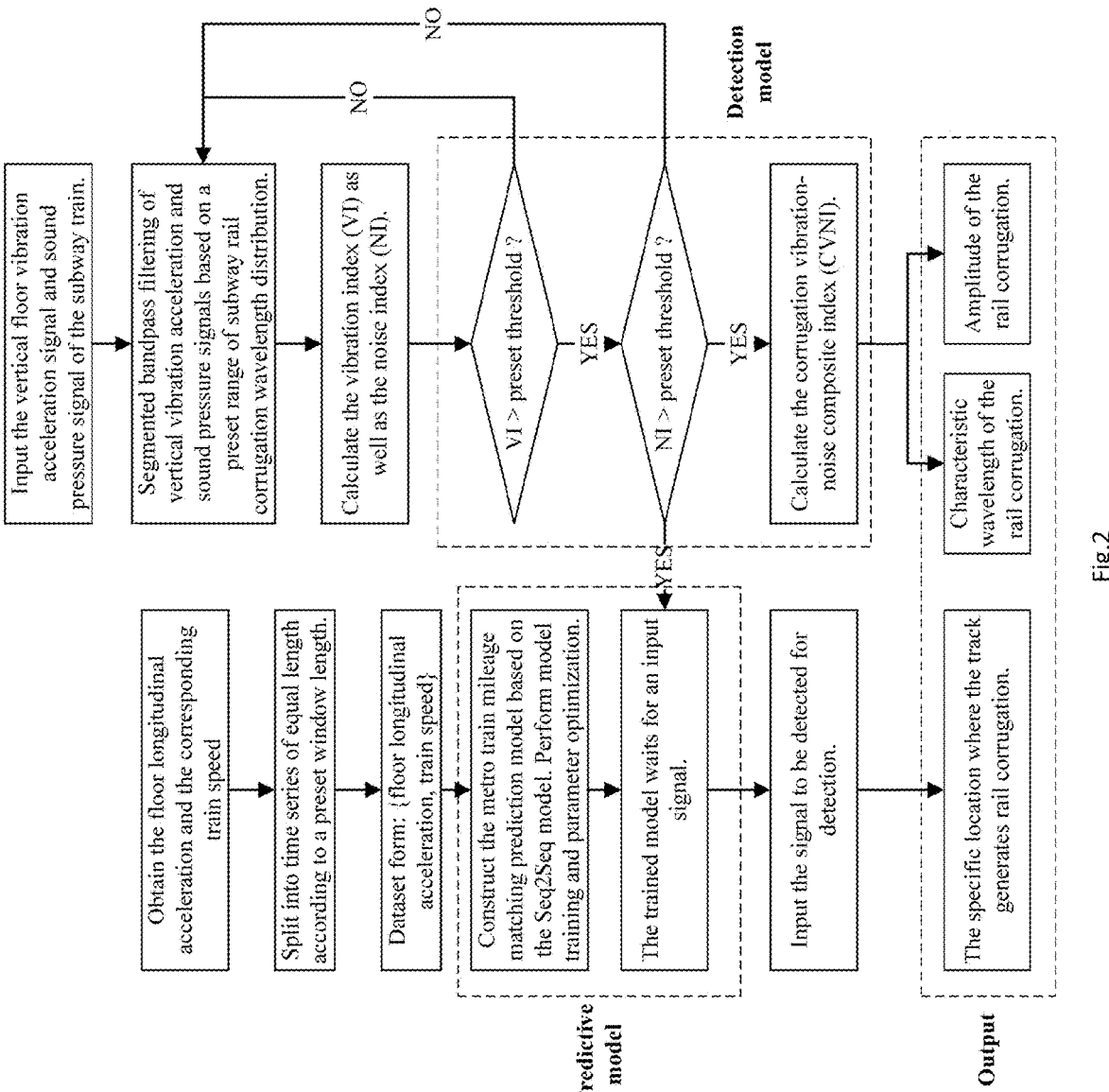
FIG. 2 is a flow chart of a metro rail corrugation rapid measurement method based on the Seq2Seq model and Vibration and noise data fusion provided by the embodiment of the invention.

The embodiment of the invention provides the schematic diagram for explaining the rail corrugation of metro, as shown in FIG. 1, and the flowchart for metro rail corrugation measurement method based on the Seq2Seq model and vibration and noise data fusion, as is shown in FIG. 2, including the following processing steps:

Step S1: acquire the vertical and longitudinal vibration acceleration signals of the floor surface at the bogie position in the subway train based on the historical data of the metro train, and obtain the vertical and longitudinal vibration time domain information of the floor in the metro train according to the vertical and longitudinal vibration acceleration signals;

Step S2: acquire the sound pressure in the vehicle measured signal at the bogie position of the metro train, and obtain the inside sound pressure time domain information according to the sound pressure signal;

Step S3: acquire the measured speed signal on a speed measuring wheel set of metro train, and obtain the train speed signal according to the speed signal;

Step S4: divide the longitudinal vibration acceleration signal and the train speed signal of the floor surface into the longitudinal acceleration and train speed signals of segmented floor according to the preset window length, and generate the time series data set corresponding to the longitudinal vibration acceleration signal and the train speed.

Figure 3:
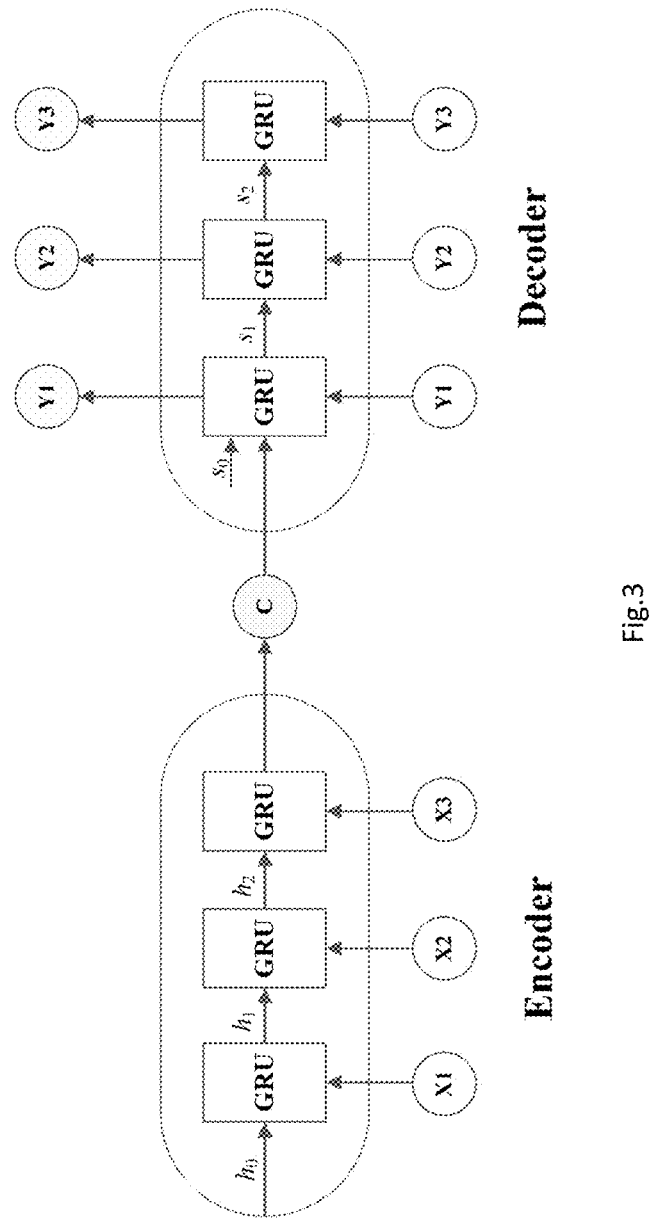
FIG. 3 is the structural diagram of the metro train mileage matching prediction model based on the Seq2Seq model provided by the embodiment of the invention.

Step S5: construct the metro train mileage matching prediction model based on the Seq2Seq model, input the time series data set of {floor longitudinal acceleration, train speed}, and train the metro train mileage matching prediction model based on the Seq2Seq model; FIG. 3 shows the structural diagram of the metro train mileage matching prediction model based on the Seq2Seq model provided by the embodiment of the invention.

Step S6: input the floor longitudinal acceleration of the metro train to be detected into the trained metro train mileage matching prediction model based on the Seq2Seq model to obtain the running speed and mileage of the metro train;

Step S7: implement the segmented band-pass filtering on the floor vertical vibration acceleration and the sound pressure signal in the vehicle according to the wavelength distribution range of the preset metro rail corrugation and the running speed of the train;

Step S8: calculate the vibration index and noise index corresponding to the filtered vertical vibration acceleration of the floor and the sound pressure signal in the vehicle;

Step S9: further calculate the vibration and noise composite index of the floor vertical vibration acceleration signal and sound pressure signal with vibration index and noise index greater than the preset threshold;

Step S10: determine the rail corrugation wavelength and amplitude according to the vibration and noise composite index, and locate the specific position of rail corrugation according to the metro train mileage matching prediction model.

Specifically, in the step S4, the floor longitudinal acceleration and train speed signals are divided into segmented floor longitudinal acceleration and train speed signals according to the preset window length to generate the time series data set with the shape of {floor longitudinal acceleration and train speed}, including:

The longitudinal vibration acceleration signal and the train speed signal are resampled to ensure that the length of the longitudinal acceleration time series is equal to that of the train speed time series, set as $L_s$;

When the time series of longitudinal acceleration is $x_i$ (i=0, 1, . . . , $x_n$), the time series of train speed is $y_j$ (j=0, 1, . . . , $y_n$), and the number of time steps is set to K, the sample number of the constructed data set is determined by formula (1);

$$N = L_s - K + 1 \qquad (1)$$

The time series data set format of the {floor longitudinal acceleration, train speed} is determined by formula (2).

$$\{[[x_0, x_1, ..., x_{K-1}], [y_0, y_1, ..., y_{K-1}]], \qquad (2)$$

$$[[x_K, x_{K+1}, ..., x_{2K-1}], [y_K, y_{K+1}, ..., y_{2K-1}]],$$

$$...$$

$$[[x_{NK}, x_{NK+1}, ..., x_{NK-1}], [y_{NK}, y_{NK+1}, ..., y_{NK-1}]]\}$$

Specifically, the metro train mileage matching prediction model based on the Seq2Seq model in the above step S5 belongs to a Many-to-Many recurrent neural network, in which the encoder partly uses GRU (Gate Recurrent Unit) to encode the longitudinal acceleration time series and output the hidden state of the last step, and the decoder is also composed of GRU recurrent neural network and utilizes the last step hidden state of the encoder and the train speed time series as inputs;

The time series data set corresponding to the longitudinal acceleration and the train speed is divided into the training set, the verification set and the test set; Among them, the ratio of training set, verification set and test set is 6:2:2;

The training of metro train mileage matching prediction model based on the Seq2Seq model includes:

Inputting the training set into the metro train mileage matching prediction model based on the Seq2Seq model, the optimal parameters of the model could be found through K-fold cross verification;

Inputting the verification set into the metro train mileage matching prediction model based on the Seq2Seq model in the optimal parameters, the trained metro train mileage matching prediction model based on the Seq2Seq model could be obtained after passing the verification; The trained metro train mileage matching prediction model based on the Seq2Seq model could output the corresponding metro train running speed time series by inputting the longitudinal acceleration time series of the metro train interior floor;

Inputting the test set into the trained metro train mileage matching prediction model based on the Seq2Seq model for train mileage matching prediction, the train running speed and mileage could be obtained.

Specifically, in the above step S7, the vertical vibration acceleration of the floor and the sound pressure signal in the vehicle are subjected to segmented band-pass filtering according to the preset wavelength distribution range of the metro rail corrugation and the running speed of the train;

Wherein, the length of the floor vertical vibration acceleration signal is equal to that of the sound pressure signal in the vehicle, setting as $L_v$, the segment length as W, and the overlap rate is ¾; If the length of the residual signal is greater than or equal to W, add 0 until the length is equal to W; Otherwise, abandon the residual signal;

According to the preset wave length distribution range $[\lambda_L, \lambda_H]$ of metro rail corrugation, the corresponding upper and lower cutoff frequencies $[f_L, f_H]$ are calculated. And the band-pass filter based on the window function method is designed, with the filter order of n. The vertical vibration acceleration signal of the segmented floor and the sound pressure signal in the vehicle are band-pass filtered to obtain the filtered segmented floor vertical vibration acceleration signal $sig_{vb}$ and the inside sound pressure signal $sig_{no}$;

Wherein the upper and lower cutoff frequencies are determined by formula (3);

$$f_L = \frac{\overline{V}_W}{\lambda_H}, f_H = \frac{\overline{V}_W}{\lambda_L} \qquad (3)$$

In the formula, $\nabla_W$ is the average speed of segmented trains determined by the metro train mileage matching prediction model.

In particular, the calculation of the vibration index and noise index corresponding to the filtered floor vertical vibration acceleration and the sound pressure signal in the vehicle in the above step S8 includes:

Calculating the self-power spectral density of the segmented floor vertical vibration acceleration signal $sig_{vb}$, and finding the peak frequency $f_{vmax}$ in the $[f_L, f_H]$ frequency band, band-pass filter remains carrying out on the segmented vertical vibration acceleration signal $sig_{vb}$ according to $[f_{vmax}-D, f_{vmax}+D]$, and the vibration index is determined by formula (4);

$$VI(i) = \frac{S_{Vi}(\mathrm{filter}_{(f_{v\,max}-D, f_{v\,max}+D)}[sig_{vb}])}{S_{Vtotal}} \qquad (4)$$

In the formula, VI(i) is the vibration index of the vibration signal in the $i^{th}$ frame, $sig_{vb}$ is the vibration signal after the first filtering, filter is the band-pass filter, D is half of the pass-band width, $f_{vmax}$ is the peak frequency in the self-power spectral density of the vibration signal in the $i^{th}$ frame, $S_{Vtotal}$ is the effective value of the vibration signal after the first filtering, and $S_{Vi}$ is the effective value of the vibration signal after the second filtering, which is determined by formula (5);

$$S_{Vi} = \sqrt{\frac{\sum_{n=i}^{i+W} x_{Vn}^2}{W_V}} \tag{5}$$

Where $W_V$ is the length of vibration signal in each frame; Calculating the self-power spectral density of the segmented inside sound pressure signal $sig_{no}$, and finding the peak frequency $f_{nmax}$ in the $[f_L, f_H]$ frequency band, band-pass filter continues to band-pass filter the segmented inside sound pressure signal $sig_{no}$ according to $[f_{nmax}-D, f_{nmax}+D]$, and the noise index is determined by formula (6);

$$NI(i) = \frac{S_{Ni}(\text{filter}_{(f_{n\,max}-D, f_{n\,max}+D)}[sig_{no}])}{S_{Ntotal}} \tag{6}$$

In the formula, NI(i) is the noise index of the noise signal in the $i^{th}$ frame, $sig_{no}$ is the noise signal after the first filtering, filter is the band-pass filter of window function, D is half of the pass-band width, $f_{nmax}$ is the peak frequency in the self-power spectral density of the noise signal in the $i^{th}$ frame, $S_{Ntotal}$ is the effective value of the noise signal after the first filtering, and $S_{Ni}$ is the effective value of the noise signal after the second filtering, which is determined by formula (7);

$$S_{Ni} = \sqrt{\frac{\sum_{n=i}^{i+W} x_{Nn}^2}{W_N}} \tag{7}$$

Where $W_N$ is the length of the noise signal in each frame.

In the example of the above step S8, the segmented vertical vibration acceleration signal $sig_{vb}$ is continued to band-pass filter based on the $[f_{vmax}-D, f_{vmax}+D]$, and the segmented inside sound pressure signal $sig_{no}$ is continued the band-pass filter based on $[f_{nmax}-D, f_{nmax}+D]$, which specifically includes:

The pass-band width 2D is decided according to the peak frequencies $f_{vmax}$ and $f_{nmax}$ in the self-power spectral density of the segmented vertical vibration acceleration signal and the segmented sound pressure signal in the vehicle, which is determined by formula (8):

$$D = f_h\left(\frac{A(f_{i\,max})}{\sqrt{2}}\right) - f_l\left(\frac{A(f_{i\,max})}{\sqrt{2}}\right) \tag{8}$$

In the formula, $f_{vmax}$ (i=v or n) represents the peak frequency $f_{vmax}$ or $f_{nmax}$, $A(f_{imax})$ represents the amplitude of power spectral density corresponding to the peak frequency, $f_h(\ )$ represents the larger frequency value corresponding to the amplitude, and $f_l(\ )$ represents the smaller frequency value corresponding to the amplitude;

The upper and lower cutoff frequencies $[f_{imax}-D, f_{imax}+D]$ are determined by $f_{imax}$ and the pass-band width 2D, and the window function band-pass filter is designed to band-pass filter the vertical vibration acceleration signal of the segmented floor and the sound pressure signal in the segmented vehicle respectively, so as to obtain the rail corrugation characterization signals $C_{Vi}$ and $C_{Ni}$.

In the above step S9, further calculation is implemented on the vibration and noise composite index of rail corrugation with the vibration index and the noise index greater than the preset threshold, which specifically includes:

According to the statistical analysis on a large number of measured data, it is determined that the vibration index threshold is $VI_m$ and the noise index threshold is $NI_m$. If the vibration index VI(i) corresponding to the vertical vibration acceleration signal of the segmented floor is greater than $VI_m$ and the noise index NI(i) corresponding to the sound pressure signal in the segmented vehicle is greater than $NI_m$, the cross-power spectrum of the vertical vibration acceleration signal of the segmented floor and the sound pressure signal in the vehicle is calculated.

Finding the peak frequency $f_{vnmax}$ in the frequency band $[f_L, f_H]$, the acoustic-vibration composite signal is subjected to band-pass filter according to $[f_{vnmax}-D, f_{vnmax}+D]$, then the vibration and noise composite index is determined by formula (9);

$$CVNI(i) = \frac{S_{VNi}(\text{filter}_{(f_{vn\,max}-D, f_{vn\,max}+D)}[sig_{vn}])}{S_{VNtotal}} \tag{9}$$

In the formula, CVNI(i) is the vibration and noise composite index of the trail corrugation in the $i^{th}$ frame, $sig_{vn}$ is the acoustic-vibration composite signal, filter is the window function band-pass filter, D is half of the pass-band width, $f_{vnmax}$ is the peak frequency in the cross-power spectrum of the acoustic-vibration signal in the $i^{th}$ frame, $S_{VNtotal}$ is the effective value of the acoustic-vibration composite signal after the first filtering, and $S_{VNi}$ is the effective value of the acoustic-vibration composite signal after the second filtering, which is determined by formula (10);

$$S_{VNi} = \sqrt{\frac{\sum_{n=i}^{i+W} x_{VNn}^2}{W_{VN}}} \tag{10}$$

In this example, the calculation of the rail corrugation Vibration and noise composite index of the acoustic-vibration composite signal and the band-pass filtering of the acoustic-vibration composite signal according to $[f_{vnmax}-D, f_{vnmax}+D]$ specifically include:

The acoustic-vibration composite signal is calculated according to the vertical vibration acceleration signal of the floor and the sound pressure signal in the vehicle, which is determined by formula (11);

$$sig_{vn} = sig_{vb} \times sig_{no} \tag{11}$$

In the formula, $sig_{vb}$ is the vertical vibration acceleration signal of the floor after the first filtering, and $sig_{no}$ is the sound pressure signal in the vehicle after the first filtering;

The upper and lower cutoff frequencies [$f_{vnmax}$–D, $f_{vnmax}$+D] are determined on the basis of $f_{vnmax}$ and pass-band width 2D, the window function band-pass filter is designed to band-pass filter the acoustic-vibration composite signal $sig_{vn}$, so as to obtain the rail corrugation character-ization signal $C_{VNi}$.

In the above step S10, the wavelength and amplitude are determined according to the vibration and noise composite index of the rail corrugation, and the specific location of the rail corrugation is determined according to the metro train mileage matching prediction model, which specifically includes:

If the speed v(t) is obtained by the metro train mileage matching prediction model based on the Seq2Seq model, the train position is determined by formula (12);

$$x(t) = \int_0^t v(t)dt \qquad (12)$$

According to the peak frequency $f_{vnmax}$ and the average vehicle speed V corresponding to the segmented acoustic-vibration composite signal, the wavelength of rail corruga-tion is identified, which is determined by formula (13);

$$\lambda_{i,detect} = \begin{cases} 0, & \text{no corrugation in frame } i \\ \dfrac{V}{f_{vn\,max}} & \text{corrugation in frame } i \end{cases} \qquad (13)$$

The severity of rail corrugation, that is, the range of amplitude, is identified in accordance with the corrugation vibration and noise composite index corresponding to the segmented acoustic-vibration composite signal, which is determined by formula (14):

$$\begin{cases} CVNI \ (i) < 0.4 \rightarrow \text{general corrugation} \\ 0.3 < CVNI(i) < 0.6 \rightarrow \text{severe corrugation} \\ CVNI(i) > 0.6 \rightarrow \text{very severe corrugation} \end{cases} \qquad (14)$$

The working principle is that the invention considers that when the urban rail transit vehicle runs in the tunnel, the vehicle speed fails to be measured effectively by GPS positioning, and the running data of the train itself could not be easily obtained either, so that the train position is able to be determined by the relationship between the longitudinal acceleration of the vehicle body and the vehicle speed. In addition, the vertical vibration acceleration and the time-frequency characteristics of the sound pressure signal in the vehicle are significantly different between the rail corruga-tion section and the normal section, and the corrugation component in the signal can be effectively extracted by the vibration and noise data fusion. Therefore, in the invention, the metro train mileage matching prediction model based on the Seq2Seq model is trained by using the longitudinal acceleration of the floor in the vehicle and the time series data of the train speed, the speed and mileage of the metro train are accurately predicted by the longitudinal accelera-tion of the car body, at the same time, the characteristic wavelength and amplitude of rail corrugation is accurately identified by employing the fusion of the floor vertical vibration acceleration and the sound pressure signal in the vehicle.

Example 2

The difference between the example 2 from example 1 is that the example 2 utilizes the rapid measurement method of metro rail corrugation which build on the example 1 based on the Seq2Seq model as well as vibration and noise data fusion, and the implementation is as follows:

It is divided into the following ten steps: 1) The vertical and longitudinal vibration acceleration signals of the floor and sound pressure signals in the metro train are measured; 2) The actual running speed signal of the train is acquired according to the on-board ATP system of the metro train; 3) The longitudinal acceleration of the floor in the metro train and the train speed signal are resampled at the same fre-quency to construct the data set (longitudinal acceleration of the floor and train speed); 4) The {floor longitudinal accel-eration, train speed} data set is divided into training set, verification set and test set; 5) The metro train mileage matching prediction model based on the Seq2Seq model is built to be trained on the training set and be evaluated on the verification set, finally getting the trained metro train mile-age matching prediction model based on the Seq2Seq model, which would be input into the test set for examining; 6) The band-pass filtering is carried out on the vertical vibration acceleration signal of the segmented floor and the sound pressure signal in the vehicle according to the preset wavelength distribution range of the metro rail corrugation; 7) Respective calculations are implemented on the vibration index and noise index corresponding to the filtered floor vertical vibration acceleration signal and the sound pressure signal in the vehicle; 8) If the vibration index and the noise index are both greater than the preset threshold, calculating the acoustic-vibration composite signal; 9) The vibration and noise composite index corresponding to the acoustic-vibration composite signal is calculated; 10) The key infor-mation is output, such as characteristic wavelength and amplitude of rail corrugation according to the vibration and noise composite index.

The equipment adopted by the method of the invention comprises:

The acceleration sensor, is arranged on the inner floor of the metro train and used for measuring the vertical and longitudinal vibration acceleration signals of the floor in the vehicle;

The sound pressure sensor, is arranged in the carriage of the metro train and used for measuring the sound pressure signal in the vehicle;

Pulse speed sensor, is arranged on the axle of the train and serves as a part of the on-board ATP system, which is used to collect the running speed of the train;

The data acquisition module, is connected with the accel-eration sensor and the sound pressure sensor, used for acquiring vibration and sound pressure signals to obtain the time domain information of vibration and noise;

The data processing module, is connected with the data acquisition module and used for processing the data collected by the data acquisition module into a format which can be recognized by computers;

The acceleration sensor and the sound pressure sensor are arranged on the inner floor above the bogie of the metro train, so that the related vibration and sound pressure signals generated by rail corrugation can be obtained to ensure the best identification effect.

The following is the examples of the implementation method:

Data Description

Figure 4:
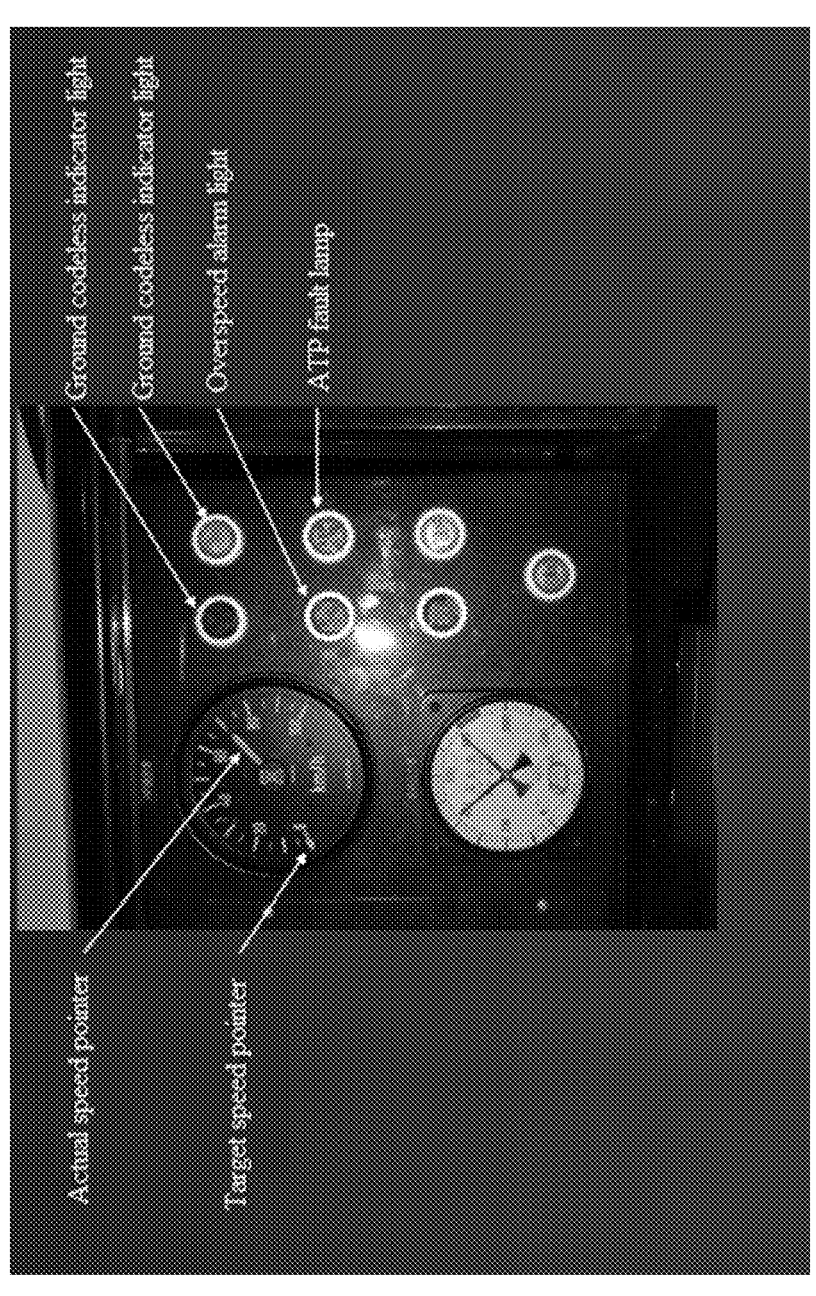
FIG. 4 is the basic composition schematic diagram of the metro train ATP system provided by the embodiment of the invention.

The field test was carried out on a section metro line in a domestic city, and the train speed signal was obtained by using the train running signal recorded by the on-board ATP system, as shown in FIG. 4.

Figure 5:
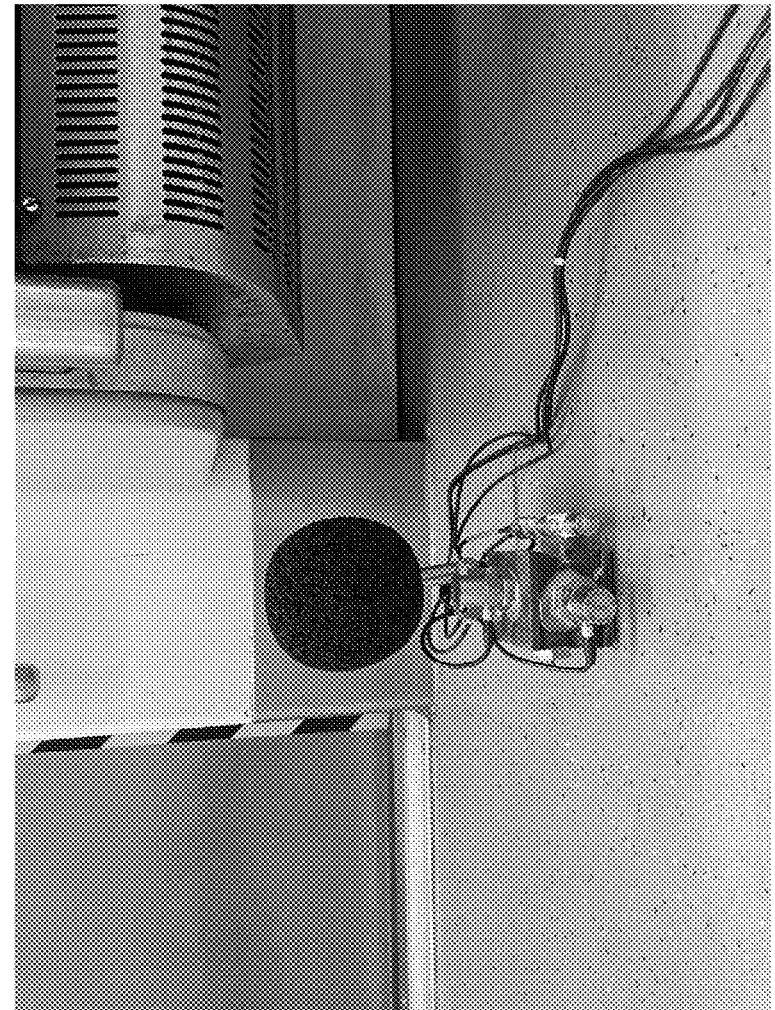
FIG. 5 is the schematic diagram for testing vertical and vertical vibration acceleration and the sound pressure in the vehicle provided by the embodiment of the invention.

The multi-channel 24AD high-precision data acquisition system is employed to obtain the vibration and sound pressure signals inside the vehicle, as shown in FIG. 5.

(2) Data Segmentation

Figure 6:
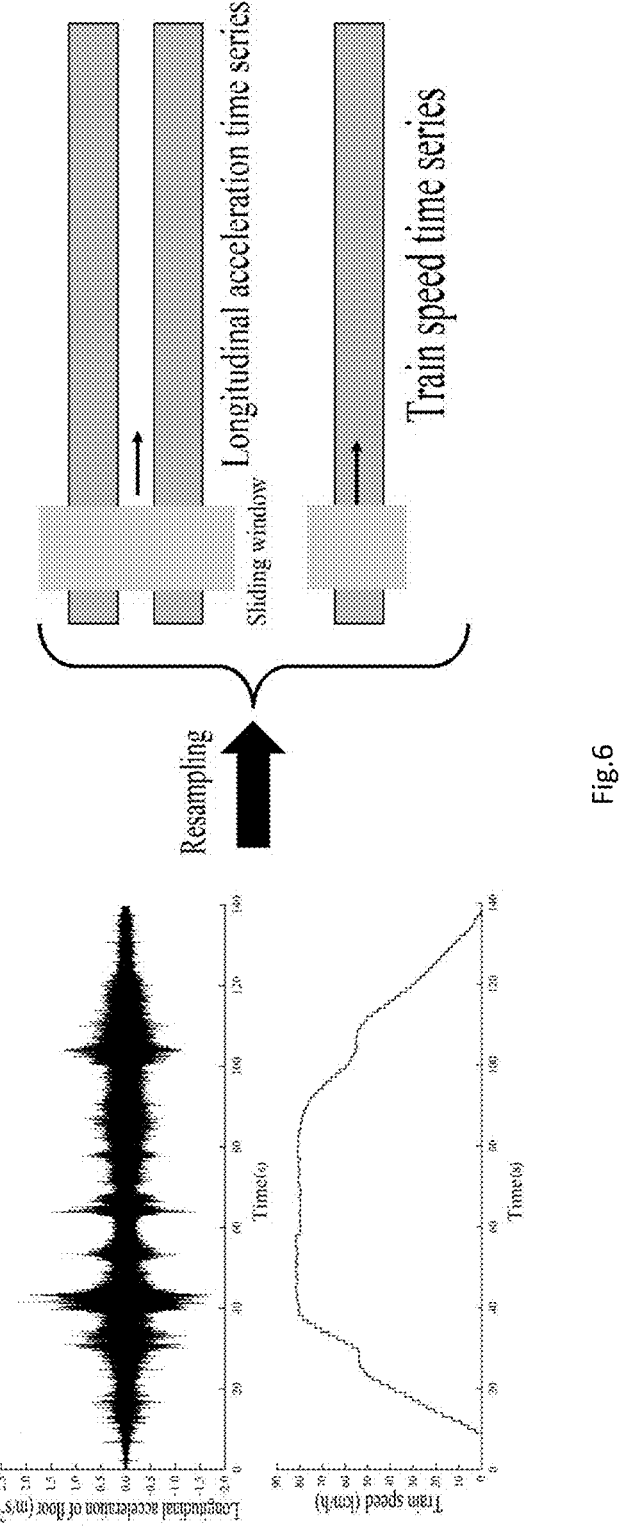
FIG. 6 is the data segmentation schematic diagram of floor longitudinal acceleration and train speed provided by the embodiment of the invention.

The floor longitudinal acceleration and train speed signals are resampled to ensure that the time series length of the floor longitudinal acceleration and train speed are equal, and the preset window length is used to cut the signals to obtain one-to-one corresponding data sets of {floor longitudinal acceleration, train speed}, as shown in FIG. 6.

Partition of the Sample Data Set

The sample data set is randomly divided into training set, verification set and test set, where the ratio of training set, verification set and test set is 6:2:2.

Model Training

The training set is input into the model to perform K-fold cross validation for obtaining the optimal parameters of the model, and then the optimal parameters of the model is used to obtain the optimal model of the metro train mileage matching prediction model.

Signal Filtering

Figure 7:
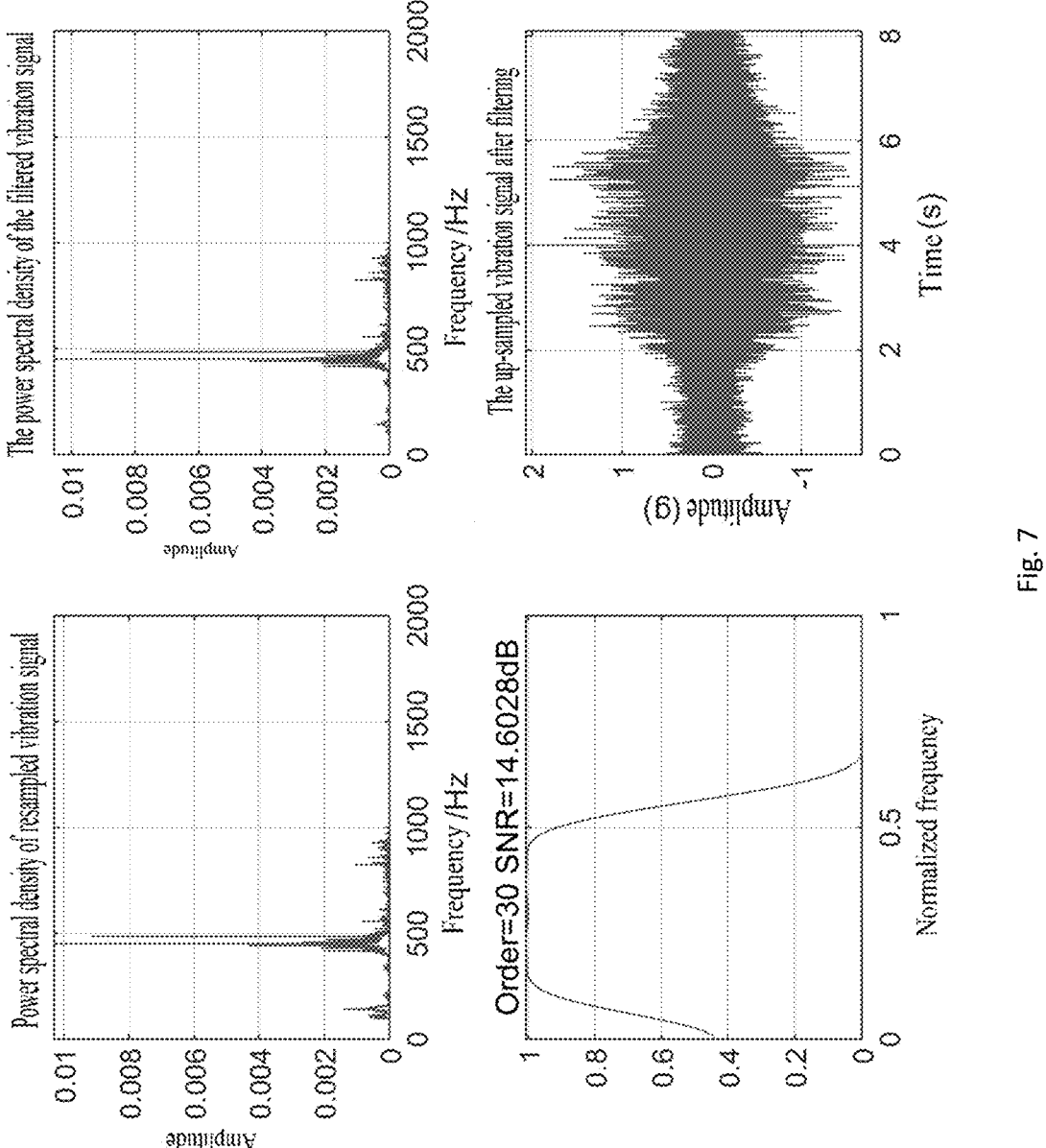
FIG. 7 is the schematic diagram of band-pass filtering for floor vertical vibration acceleration signals provided by the embodiment of the invention.

The vertical vibration acceleration signal of the floor and the sound pressure signal in the vehicle obtained by the test are band-pass filtered according to the preset distribution range of metro rail corrugation. The filter is the window function filter with the filter order n=30, as shown in FIG. 7.

Calculation of the Vibration Index

Figure 8:
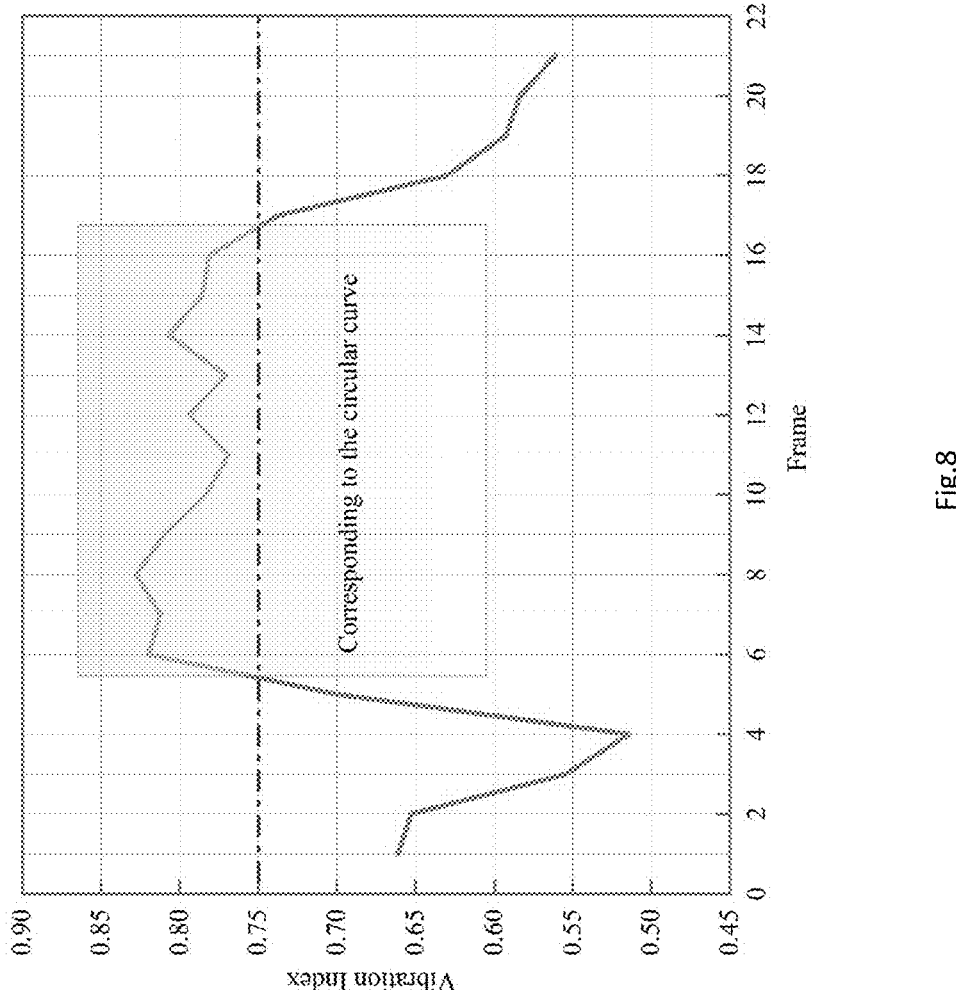
FIG. 8 is the schematic diagram of a vibration index calculation result provided by an embodiment of the present invention.

The filtered floor vertical vibration acceleration signal is segmented according to the preset window length, and the vibration index corresponding to each segmented vibration acceleration signal is calculated, as shown in FIG. 8.

Calculation of the Noise Index

Figure 9:
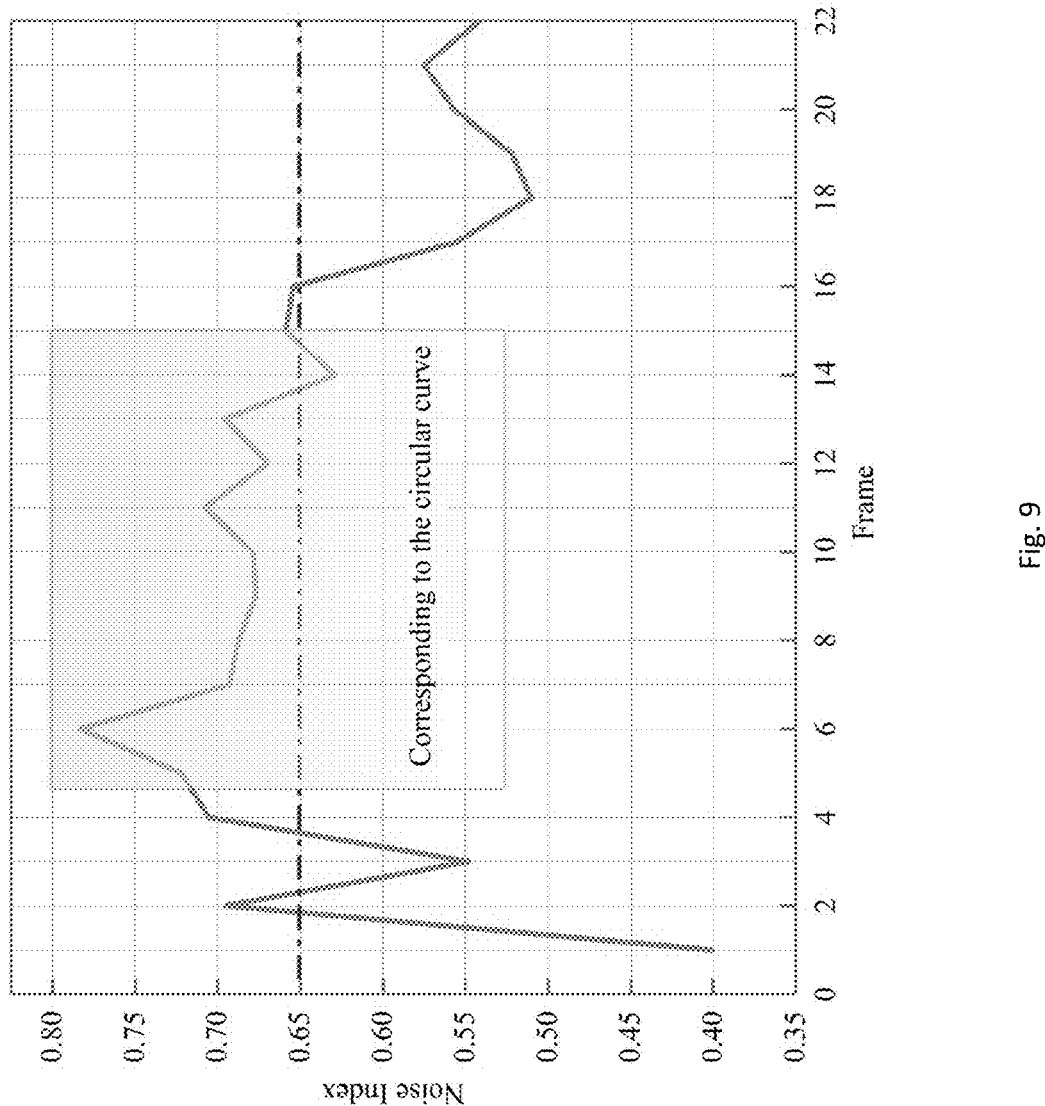
FIG. 9 is the schematic diagram of a noise index calculation result provided by the embodiment of the invention.

The filtered sound pressure signal in the vehicle is segmented according to the preset window length, and the noise index corresponding to each segmented inside sound pressure signal is calculated, as shown in FIG. 9.

Calculation of the Rail Corrugation Vibration and Noise Composite Index

Figure 10:
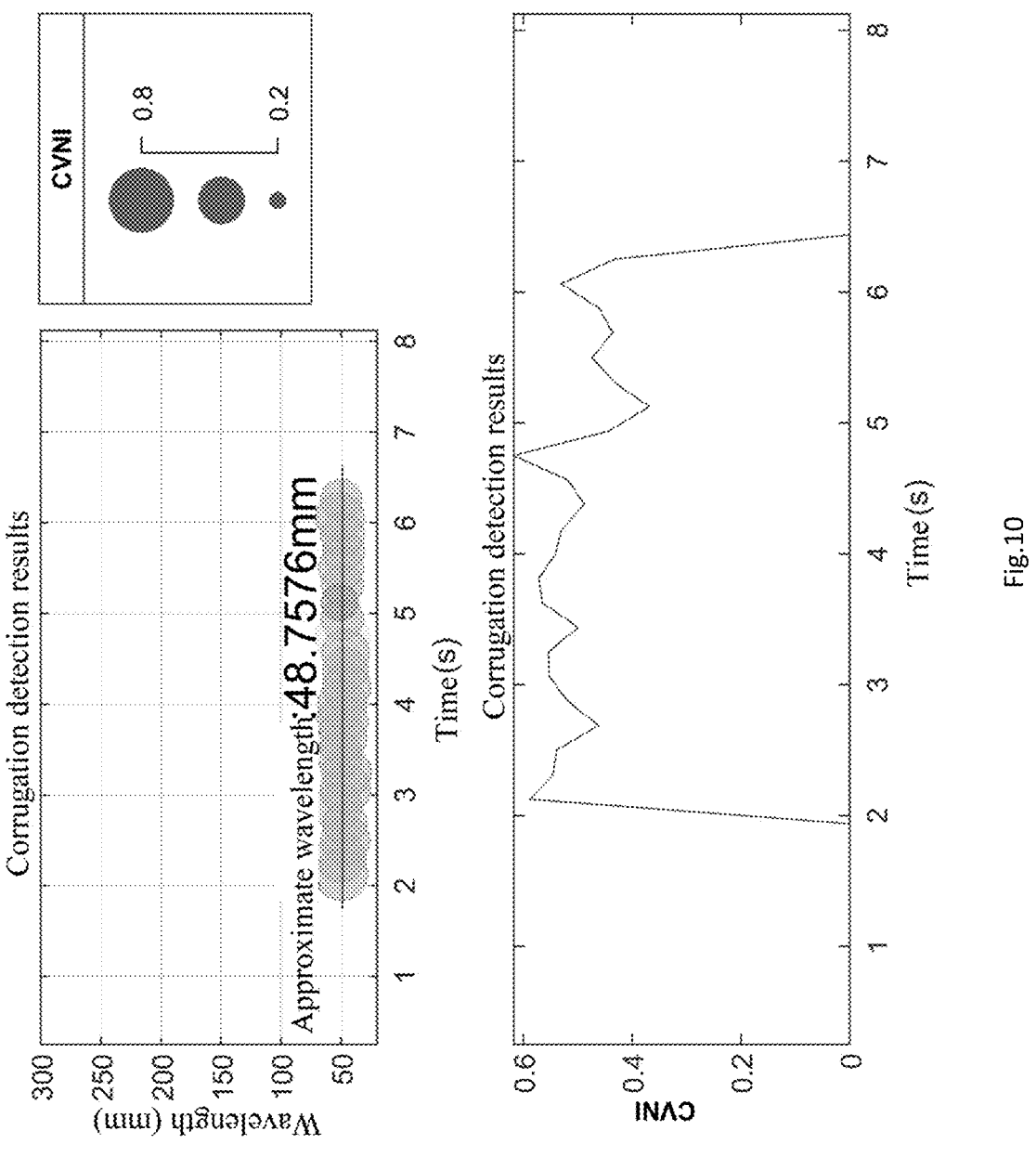
FIG. 10 is the calculation result schematic diagram of the rail corrugation vibration and noise composite index provided by the embodiment of the invention.

If the vibration index and noise index are greater than the preset threshold, calculate the acoustic-vibration composite signal, and segment it according to the preset window length, so as to calculate the rail corrugation vibration and noise composite index corresponding to each segmented acoustic-vibration composite signal, as shown in FIG. 10.

Output of Test Result

According to the peak frequency $f_{vmax}$ corresponding to the cross-power spectral density of the floor vertical vibration acceleration signal and the sound pressure signal in the vehicle, as well as the train speed output by the metro train mileage matching prediction model, the characteristic wavelength of the rail corrugation is obtained; According to the rail corrugation vibration and noise composite index, the information of rail corrugation amplitude is obtained, as shown in FIG. 10.

To sum up, compared with the existing intelligent test method of rail corrugation, the examples of the invention can accurately identify the mileage generated by rail corrugation through taking the use of the floor vertical and longitudinal vibration acceleration and the sound pressure signal in the vehicle, and at the same time can identify the key information such as characteristic wavelength and amplitude of the corresponding rail corrugation.

It can be understood by those skilled in the field that the attached drawing is only a schematic diagram of an embodiment, and the modules or processes in the attached drawing are not necessary for implementing the invention.

From the description of the above embodiments, those skilled in the field can clearly understand that the invention can be realized by means of software and necessary general hardware platform. Based on this understanding, the technical scheme of the invention, in essence or in the part that contributes to the current technology, can be embodied in the form of a software product, which can be stored in a storage medium, such as ROM/RAM, a magnetic disk, an optical disk, etc., including several instructions to make a computer device (which can be a personal computer, a server, a network device, etc.) perform the methods described in various embodiments or parts of embodiments in the invention.

Each embodiment in this specification is described in a progressive way, and the same and similar parts between the embodiments can be referred to each other, and each embodiment focuses on the differences from other embodiments. Especially, as for the device or system embodiment, which is basically similar to the method embodiment, as a result, its description is relatively simple, and the relevant points can only be found in part of the method embodiment description. The embodiments of the device and system described above are only schematic, wherein the units described as separate components may or may not be physically separated, and the components displayed as units may or may not be physical units, that is, they may be located in one place or distributed to multiple network units. Some or all of the modules can be selected according to actual requirements to achieve the purpose of this embodiment. The ordinary technicians in this field can understand and implement it without creative labor.

The above is only the preferred embodiment of the invention, but the protection scope of the invention is not limited to this. And any change or substitution, that can be easily thought of by a person familiar with the technical field within the technical scope disclosed by the invention, should be included in the protection scope of the invention. Therefore, the protection scope of the invention should take the protection scope of the claims as standard.

What is claimed is:

1. A metro rail corrugation measurement method based on a Seq2Seq model and vibration and noise data fusion, comprising a non-transitory computer readable medium operable on a computer with memory for the metro rail corrugation measurement method, and comprising program instructions for executing the following steps of:

constructing a time series data set corresponding to floor longitudinal acceleration and train speed based on historical data of a metro train, the time series data set comprising a longitudinal acceleration time series and a train speed time series;

wherein constructing the time series data set corresponding to the floor longitudinal acceleration and the metro train based on the historical data of the metro train comprises:

acquiring a vertical and longitudinal vibration acceleration signals from an acceleration sensor arranged on a floor surface above a bogie of the metro train based on the historical data of the metro train, and obtaining vertical and longitudinal vibration time domain information of the floor in the metro train based on the vertical and longitudinal vibration acceleration signals;

acquiring a measured sound pressure signal from a sound pressure sensor arranged in a carriage above the bogie of the metro train, and obtaining a sound pressure time domain information in the metro train accordingly;

acquiring a measured speed signal from a speed measuring wheelset sensor arranged on an axle of the metro train, and obtaining a train speed signal accordingly; and dividing the longitudinal vibration acceleration signal and the train speed signal into segmented longitudinal acceleration signals based on a preset window length, to generate the time series data set corresponding to the longitudinal vibration acceleration signal and the train speed, wherein the dividing comprises:

the longitudinal vibration acceleration signal and the train speed signal are resampled to ensure that a length of the longitudinal acceleration time series is equal to a length of the train speed time series, setting the length as $L_s$;

determining a sample number N of the time series data set according to formula (1), wherein the longitudinal acceleration time series is denoted as $x_i$ (i=0, 1, ..., $x_n$), and the train speed time series is denoted as $y_j$ (j=0, 1, ..., $y_n$), and a time step number is set to K:

$$N = L_s - K + 1; \qquad (1)$$

and generating the time series data set corresponding to the longitudinal vibration acceleration signal and the train speed according to formula (2);

$$\{[[x_0, x_1, \ldots, x_{K-1}], [y_0, y_1, \ldots, y_{K-1}]], \qquad (2)$$

$$[[x_K, x_{K+1}, \ldots, x_{2K-1}], [y_K, y_{K+1}, \ldots, y_{2K-1}]],$$

$$\ldots$$

$$[[x_{NK}, x_{NK+1}, \ldots, x_{NK-1}], [y_{NK}, y_{NK+1}, \ldots, y_{NK-1}]]\};$$

constructing a metro train mileage matching prediction model based on the Seq2Seq model, which is trained by the time series data set corresponding to the longitudinal acceleration;

inputting a longitudinal acceleration signal of a floor inside of the metro train to be detected into the trained metro train mileage matching prediction model based on the Seq2Seq model to obtain a running speed of the metro train to be detected;

calculating a vibration and noise composite index of the metro rail corrugation to be detected based on a preset wavelength distribution range of the metro rail corrugation, the running speed of the metro train to be detected, a vertical vibration acceleration of the floor, and a sound pressure signal in the metro train;

determining a specific position of the metro rail corrugation, a corresponding characteristic wavelength, and an amplitude based on the rail corrugation vibration and noise composite index; and outputting the determined specific position of the metro rail corrugation on a train rail, the characteristic wavelength, and the amplitude determined by the metro rail corrugation measurement method, to mitigate the metro rail corrugation and to reduce vibration and noise.

2. The method according to claim 1, wherein constructing and training the metro train mileage matching prediction model based on the Seq2Seq model comprises:

constructing the metro train mileage matching prediction model as a Many to Many model of a recurrent neural network comprising an encode and a decoder, wherein the encoder utilizes a recurrent neural network model to encode a longitudinal acceleration time series and outputs a hidden state of a last step, and the decoder utilizes a recurrent neural network structure and applies the hidden state of the last step of the encoder with a train speed time series as input;

dividing the time series data set corresponding to the longitudinal acceleration and the train speed into a training set, a verification set and a test set;

inputting the training set into the metro train mileage matching prediction model and searching for optimal parameters of the model through K-fold cross verification; and inputting the verification set into the metro train mileage matching prediction model using optimal parameters to verify the metro train mileage matching prediction model to obtain the trained metro train mileage matching prediction model, wherein input data of the trained metro train mileage matching prediction model is the longitudinal acceleration time series of the floor of the metro train, and the output data is a time series corresponding to a running speed of the metro train.

3. The method according to claim 1, wherein calculating the rail vibration and noise composite index comprises:

performing segmented band-pass filtering on the vertical vibration acceleration of the floor and the sound pressure signal in the metro train according to the preset wavelength distribution range and the running speed;

calculating a vibration index and a noise index corresponding to the vertical vibration signal and the sound pressure signal after the band-pass filtering; and retaining segments of the vertical vibration acceleration and the sound pressure signal having a vibration index and a noise index greater than a preset threshold, and performing further calculation of the rail corrugation vibration and noise composite index using the retained segments.

4. The method according to claim 3, wherein performing the band-pass filtering on the vertical vibration acceleration of the floor and the sound pressure signal comprises:

assuming that a floor vertical vibration acceleration signal of the metro train to be detected is equal to the sound pressure signal in the car and is set as $L_v$, setting a segment length as W and overlap ratio as 3/4; wherein if a remaining signal length is greater than or equal to W, adding 0 until the remaining signal length is equal to W; otherwise, abandon a remaining signal;

calculating corresponding upper and lower cutoff frequencies $[f_L, f_H]$ based on the preset wavelength distribution range $[\lambda_L, \lambda_H]$ of the metro rail corrugation according to formula (3):

$$f_L = \frac{\overline{V_w}}{\lambda_H}, f_H = \frac{\overline{V_W}}{\lambda_L}, \qquad (3)$$

wherein $\overline{V}_W$ represents an average speed of segmented trains determined by the metro train mileage matching prediction model; and designing a band-pass filter based on a window function method with a filter order n, and filtering the segmented vertical vibration acceleration and the segmented sound pressure signal to obtain a band-pass filtered segmented vertical vibration acceleration signal ($sig_{vb}$) and a band-pass filtered sound pressure signal ($sig_{no}$).

5. The method according to claim 3, wherein calculating the vibration index and noise index comprises:

calculating a self-power spectral density of the segmented floor vertical vibration acceleration signal $sig_{vb}$, identifying a peak frequency $f_{vmax}$ in the [$f_L$, $f_H$] frequency band, performing a second band-pass filtering on the signal $sig_{vb}$ according to a frequency range [$f_{vmax}-D$, $f_{vmax}+D$], and determining the vibration index according to formula (4):

$$VI(i) = \frac{S_{Vi}\left(\text{filter}_{(f_{vmax}-D,f_{vmax}+D)}[sig_{vb}]\right)}{S_{Vtotal}}, \tag{4}$$

wherein VI(i) is the vibration index of an $i^{th}$ frame of the floor vertical vibration acceleration signal, $sig_{vb}$ is the vibration signal after the first filtering, "filter" represents the band-pass filter, D is half of a pass-band width, $f_{vmax}$ is the peak frequency of the $i^{th}$ frame vibration signal in the self-power spectral density, $S_{Vtotal}$ is an effective value of the vibration signal after the first filtering, and $S_{Vi}$ is an effective value of the vibration signal after the second filtering determined by formula (5):

$$S_{Vi} = \sqrt{\frac{\sum_{n=i}^{i+W} x_{V_n}^2}{W_V}}, \tag{5}$$

in the formula (5), $W_V$ is a length of each frame of the vibration signal; and calculating a self-power spectral density of the segmented inside sound pressure signal $sig_{no}$, and identifying a peak frequency $f_{nmax}$ in the frequency band [$f_L$, $f_H$], performing a second band-pass filtering on the signal $sig_{no}$ according to a frequency range [$f_{nmax}-D$, $f_{nmax}+D$], and determining the noise index according to formula (6):

$$NI(i) = \frac{S_{Ni}\left(\text{filter}_{(f_{nmax}-D,f_{nmax}+D)}[sig_{no}]\right)}{S_{Ntotal}}, \tag{6}$$

wherein NI(i) is the noise index of an $i^{th}$ frame of the noise signal, $sig_{no}$ is the noise signal after the first filtering, $f_{nmax}$ is the peak frequency of the $i^{th}$ frame noise signal in the self-power spectral density, $S_{Ntotal}$ is an effective value of the noise signal after the first filtering, and $S_{Ni}$ is an effective value of the noise signal after the second filtering determined by formula (7):

$$S_{Ni} = \sqrt{\frac{\sum_{n=i}^{i+W} x_{N_n}^2}{W_N}}, \tag{7}$$

wherein $W_N$ is a length of each frame of the noise signal.

6. The method according to claim 3, wherein performing the further calculation of the rail corrugation vibration and noise composite index comprises:

determining a vibration index threshold $VI_m$ and a noise index threshold Nlm;

calculating a cross-power spectrum between the vertical vibration acceleration of the floor and the sound pressure signal if the vibration index VI(i) is greater than $VI_m$ and the noise index NI(i) is greater than $NI_m$, identifying a peak frequency $f_{vnmax}$ in the frequency band [$f_L$, $f_H$], and band-pass filtering an acoustic-vibration composite signal according to a frequency range [$f_{vnmax}-D$, $f_{vnmax}+D$] to determine the rail corrugation vibration and noise composite index according to formula (8):

$$CVNI(i) = \frac{S_{VNi}\left(\text{filter}_{(f_{vnmax}-D,f_{vnmax}+D)}[sig_{vn}]\right)}{S_{VNtotal}}, \tag{8}$$

wherein CVNI(i) is the vibration and noise composite index of an $i^{th}$ frame, $sig_{vn}$ is the acoustic-vibration composite signal, $f_{vnmax}$ is the peak frequency in the cross-power spectrum of the $i^{th}$ frame acoustic-vibration signal, $S_{VNtotal}$ is an effective value of the acoustic-vibration composite signal after the first filtering, and $S_{VNi}$ is an effective value of the acoustic-vibration composite signal after the second filtering determined by formula (9):

$$S_{VNi} = \sqrt{\frac{\sum_{n=i}^{i+W} x_{VNn}^2}{W_{VN}}}. \tag{9}$$

7. The method according to claim 1, wherein determining a specific location of the metro rail corrugation, the corresponding characteristic wavelength and the amplitude comprises:

determining a train position x(t) based on the speed v(t) obtained by the metro train mileage matching prediction model according to formula (10);

$$x(t) = \int_0^t v(t)dt; \tag{10}$$

identifying the characteristic wavelength of the metro rail corrugation based on the peak frequency $f_{vnmax}$ and an average vehicle speed V corresponding to the segmented acoustic-vibration composite signal according to formula (11):

$$\lambda_{i,detect} = \begin{cases} 0, & \text{no corrugation in frame } i \\ \dfrac{V}{f_{vnmax}}, & \text{corrugation in frame } i \end{cases} \tag{11}$$

and identifying a severity of the metro rail corrugation representing the amplitude based on the rail corrugation vibration and noise composite index (CVNI) according to formula (12):

$$\begin{cases} CVNI\ (i) < 0.4 \rightarrow \text{general corrugation} \\ 0.3 < CVNI(i) < 0.6 \rightarrow \text{severe corrugation}. \\ CVNI(i) > 0.6 \rightarrow \text{very severe corrugation} \end{cases} \quad (12)$$

\* \* \* \* \*